(12) United States Patent
Domingue et al.

(10) Patent No.: US 11,097,272 B2
(45) Date of Patent: Aug. 24, 2021

(54) MICROFLUIDIC APPARATUSES FOR FLUID MOVEMENT CONTROL

(71) Applicant: HEWLETT-PACKARD DEVELOPMENT COMPANY, L.P., Houston, TX (US)

(72) Inventors: Chantelle Domingue, Corvallis, OR (US); Tod Woodford, Corvallis, OR (US); Manish Giri, Corvallis, OR (US); Matthew David Smith, Corvallis, OR (US); George H Corrigan, III, Corvallis, OR (US); Masoud Zavarehi, Corvallis, OR (US); Joshua M. Yu, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 345 days.

(21) Appl. No.: 16/099,172

(22) PCT Filed: Jul. 26, 2016

(86) PCT No.: PCT/US2016/044099
§ 371 (c)(1),
(2) Date: Nov. 5, 2018

(87) PCT Pub. No.: WO2018/022026
PCT Pub. Date: Feb. 1, 2018

(65) Prior Publication Data
US 2019/0210025 A1     Jul. 11, 2019

(51) Int. Cl.
*B01L 3/00* (2006.01)
*G01N 15/10* (2006.01)
*G01N 35/10* (2006.01)

(52) U.S. Cl.
CPC ... *B01L 3/502761* (2013.01); *B01L 3/502715* (2013.01); *G01N 15/1031* (2013.01);
(Continued)

(58) Field of Classification Search
CPC ............... G01N 15/10; G01N 15/1031; G01N 15/1056; B01L 3/50; B01L 3/502; B01L 3/5027; B01L 3/502715; B01L 3/502761
See application file for complete search history.

(56) References Cited

U.S. PATENT DOCUMENTS

| | | | |
|---|---|---|---|
| 6,540,895 B1 * | 4/2003 | Spence | B01L 3/502761 204/450 |
| 7,258,774 B2 * | 8/2007 | Chou | F04B 43/14 204/450 |

(Continued)

FOREIGN PATENT DOCUMENTS

| | | |
|---|---|---|
| CN | 104969063 A | 10/2015 |
| CN | 105283760 A | 1/2016 |

(Continued)

OTHER PUBLICATIONS

J. Schoendube et al. "Single-cell printing based on impedance detection", Biomicrofluidics, vol. 9, No. 1, Feb. 11, 2015 (Feb. 11, 2015), p. 014117, XP055575870. DOI: 10.1063/1.4907896.

(Continued)

*Primary Examiner* — Huy Q Phan
*Assistant Examiner* — David B Frederiksen
(74) *Attorney, Agent, or Firm* — Perry + Currier Inc

(57) ABSTRACT

According to an example, a microfluidic apparatus may include a fluid slot and a foyer that is in fluid communication with the fluid slot via a channel having a relatively smaller width than the foyer. The microfluidic apparatus may also include an electrical sensor to measure a change in an electrical field caused by a particle of interest in a fluid passing through the channel from the fluid slot to the foyer, an actuator to apply pressure onto fluid contained in the foyer, and a controller to receive the measured change in the electrical field from the electrical sensor, determine, from the received change in the electrical field, an electrical (Continued)

signature of the particle of interest, and control the actuator to control movement of the particle of interest based upon the determined electrical signature of the particle of interest.

15 Claims, 6 Drawing Sheets

(52) U.S. Cl.
CPC ........ *G01N 15/1056* (2013.01); *B01L 3/5085* (2013.01); *B01L 2200/0652* (2013.01); *B01L 2300/0645* (2013.01); *B01L 2300/0864* (2013.01); *B01L 2400/043* (2013.01); *B01L 2400/0439* (2013.01); *B01L 2400/0442* (2013.01); *G01N 35/1065* (2013.01); *G01N 2015/1006* (2013.01); *G01N 2015/1062* (2013.01); *G01N 2015/1081* (2013.01)

(56) References Cited

U.S. PATENT DOCUMENTS

| | | | |
|---|---|---|---|
| 8,062,491 | B1 | 11/2011 | Gau, Jr. |
| 8,329,437 | B1 | 12/2012 | Ayliffe et al. |
| 9,149,806 | B2 | 10/2015 | Collins |
| 9,952,169 | B2* | 4/2018 | Son ................... G01N 27/02 |
| 2001/0052460 | A1 | 12/2001 | Chien et al. |
| 2005/0118705 | A1 | 6/2005 | Rabbitt et al. |
| 2008/0213821 | A1* | 9/2008 | Liu ................... B01L 3/502776 435/39 |
| 2009/0011430 | A1* | 1/2009 | Ateya ................ G01N 27/3276 435/7.2 |
| 2012/0115755 | A1 | 5/2012 | Oh et al. |
| 2013/0086980 | A1 | 4/2013 | Gadini et al. |
| 2015/0090592 | A1* | 4/2015 | Thomson ........... G01N 15/1056 204/547 |
| 2015/0328637 | A1 | 11/2015 | Perrault et al. |
| 2015/0360236 | A1 | 12/2015 | Garcia et al. |
| 2015/0367346 | A1 | 12/2015 | Foster et al. |
| 2017/0102016 | A1* | 4/2017 | Azpiroz ........... B01L 3/502761 |

FOREIGN PATENT DOCUMENTS

| | | |
|---|---|---|
| TW | I309634 | 5/2009 |
| TW | 201531700 | 8/2015 |
| WO | WO-2007092713 A2 | 8/2007 |
| WO | WO-2011132164 A1 | 10/2011 |

OTHER PUBLICATIONS

Nguyen, T.A. et al., Microfluidic Chip with Integrated Electrical Cell-impedance Sensing for Monitoring Single Cancer Cell Migration in Three-dimensional Matrixes, Oct. 13, 2013.

* cited by examiner

MICROFLUIDIC APPARATUSES FOR FLUID MOVEMENT CONTROL

BACKGROUND

Microfluidics applies across a variety of disciplines including engineering, physics, chemistry, microtechnology and biotechnology. Microfluidics involves the study of small volumes, e.g., microliters, picoliters, or nanoliters, of fluid and how to manipulate, control and use such small volumes of fluid in various microfluidic systems and devices such as microfluidic devices or chips. For example, microfluidic biochips (which may also be referred to as a "lab-on-chip") are used in the field of molecular biology to integrate assay operations for purposes such as analyzing enzymes and DNA, detecting biochemical toxins and pathogens, diagnosing diseases, etc.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
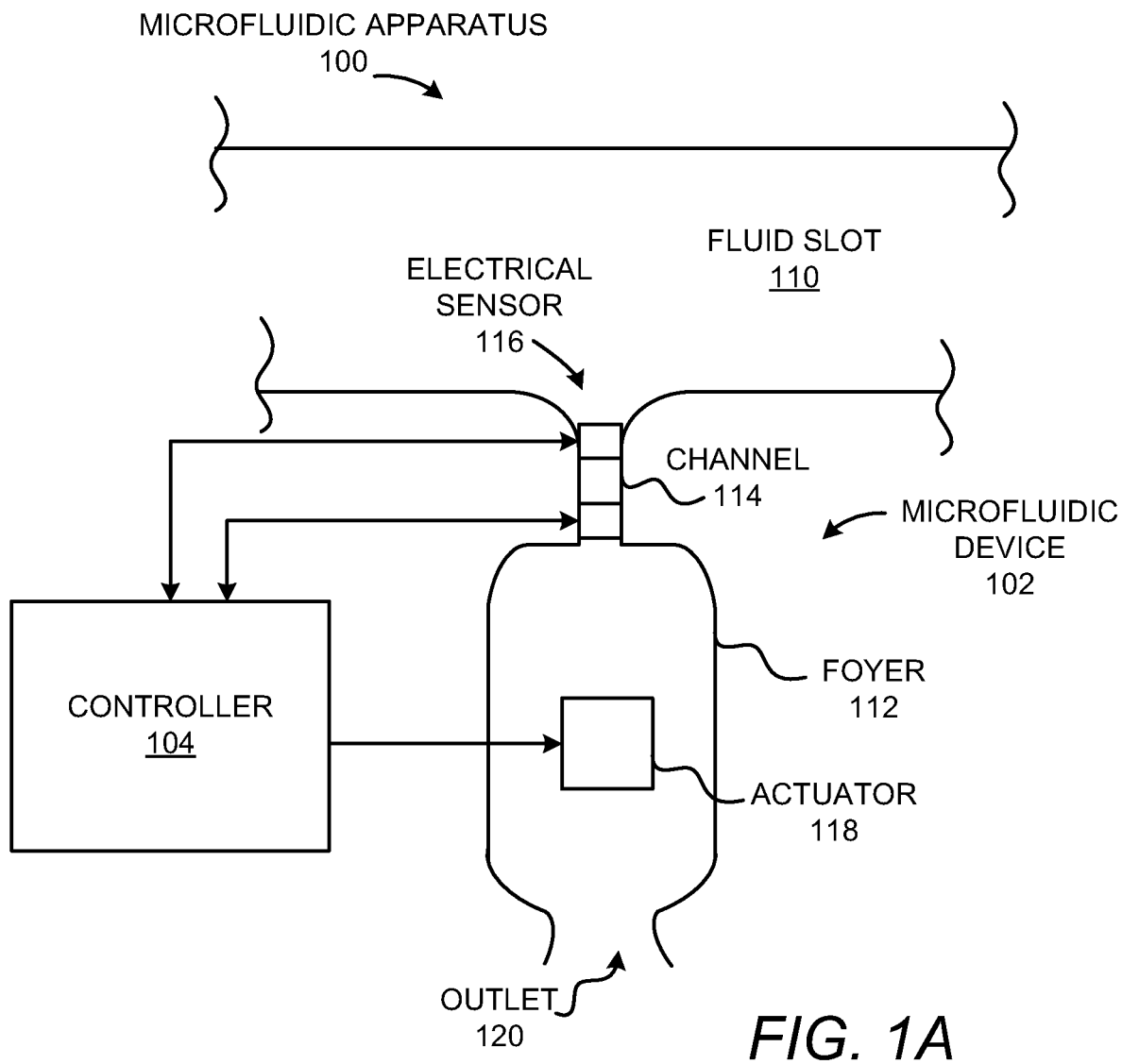
FIG. 1A shows a simplified block diagram of an example microfluidic apparatus.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are microfluidic apparatuses containing a microfluidic device or multiple microfluidic devices and methods for implementing the microfluidic device or devices. A microfluidic system disclosed herein may also include the microfluidic apparatus or a plurality of similarly configured microfluidic apparatuses. The microfluidic device may include a channel through which fluid from a fluid slot is to flow into a foyer (or equivalently, a chamber) from which the fluid may be directed to other locations in and/or outside of the microfluidic device. A sensor may be positioned to detect the passage of a particle of interest, e.g., a cell, through the channel and into the foyer. A controller may determine, from signals received from the sensor, when a particle of interest has passed through the channel and is in the foyer and may also determine an electrical signature of the particle of interest. Based upon the determined electrical signature of the particle of interest, which may be used to identify the type of the particle, the controller may control an actuator to cause the fluid contained in the foyer, and thus the particle of interest, to either be held within the foyer or to be expelled from the foyer.

According to an example, the controller may control the movement of the particle of interest based upon the detected type of the particle. For instance, the controller may cause first types of particles of interest to be directed to a first area, second types of particles of interest to be directed to a second area, and so forth. By way of example, different additional operations may be performed with respect to the particles of interest in the different areas. For instance, additional sensing operations may be performed at the first area and the second area may include a nozzle through which fluid containing the second types of particles of interest may be dispensed from the microfluidic device.

Through implementation of the microfluidic devices and methods disclosed herein, the types of particles of interest, e.g., organism cells, may be determined and fluid containing the particles of interest may be moved to different locations based upon the determined types of the particles of interest. According to an example, the microfluidic devices disclosed herein may control movement of microliter to picoliter volumes of fluid without requiring the multiflow control systems. In addition, the types of the particles of interest may be determined without tagging the particles with fluorescent labels in order to identify them. In one regard, therefore, the particles of interest may be determined and moved using relatively less expensive components and in a relatively simpler manner than are required for fluorescence-activated cell sorting operations.

By way of particular example, the particles of interest discussed herein are cells, which are the basic structural and functional unit of an organism. Most animal and plant cells range in size from 1-100 micrometers and contain vital health information. In many instances, cell-based diagnostics are the gold standard for detecting infection diseases (HIV, Malaria, Tuberculosis), as well as chronic diseases (cancer, cardiac diseases, autoimmune diseases). The microfluidic devices and methods described herein may be used to provide a configurable and mobile platform for health diagnostics.

With reference first to FIG. 1A, there is shown a simplified block diagram of an example microfluidic apparatus 100. It should be understood that the microfluidic apparatus 100 depicted in FIG. 1A may include additional components and that some of the components described herein may be removed and/or modified without departing from a scope of the microfluidic apparatus 100 disclosed herein. The microfluidic apparatus 100 is depicted as including a microfluidic device 102 and a controller 104. The microfluidic device 102 is depicted as including a fluid slot 110 and a foyer 112, in which the foyer 112 is in fluid communication with the fluid slot 110 via a channel 114. A portion of the fluid slot 110 is shown and may supply fluid to multiple microfluidic devices 102 housed in the microfluidic apparatus 100. The channel 114 is depicted as having a relatively smaller width than the foyer 112 such that the channel 114 may be considered as being pinched with respect to the foyer 112. Although the channel 114 has been depicted as having a linear configuration, the channel 114 may include other shapes, such as a curved shape, a snake-like shape, a shape with corners, combinations thereof, or the like.

An electrical sensor 116 may be positioned to detect a property of a fluid flowing from the fluid slot 110 and into the foyer 112 through the channel 114. As discussed in greater detail herein, the electrical sensor 116 may detect a presence of a particle of interest in the fluid as the fluid passes through the channel 114. For instance, the fluid contained in the fluid slot 110 may be a host fluid having particles (e.g., a blood sample containing cells, an ink containing pigments/particles, or the like). The electrical sensor 116 may generate an electrical field through which the particle of interest may pass and the particle of interest may be detected based upon a detected change in the electrical field caused by the particle of interest. An electrical signature corresponding to the particle of interest may also be determined from the change in the electrical field caused by the particle of interest.

The electrical sensor 116 may be an impedance sensor formed using semiconductor techniques and may be implemented using alternating current (AC) or direct current (DC) sensing. The electrical sensor 116 may detect impedance changes as particles in the fluid pass by the electrical sensor 116 through the channel 114. In this example, the electrical sensor 116 may include metal electrodes that may form an electrical field through which the particles may pass. The metal electrodes may be formed of any suitable electrically conductive material such as silver, platinum, gold, silver chloride, tantalum, combinations thereof or the like. The electrical sensor 116 may also detect the magnitude of impedance change caused by the particles. According to an example, the metal electrodes may be insulated to prevent Faradaic current from entering the fluid through the metal electrodes. The metal electrodes may be insulated through the use of a variety of coatings that may optimize an interface between the fluid and the metal electrodes.

Figure 1B:
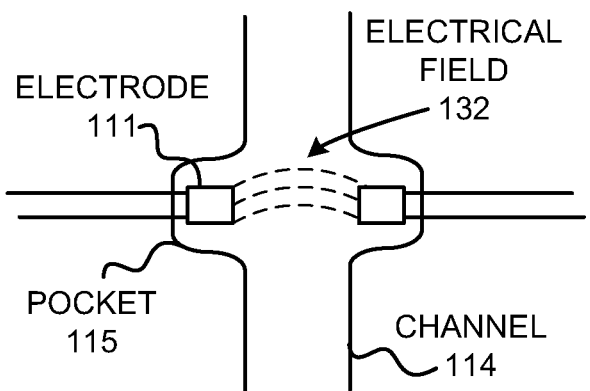
FIG. 1B shows a simplified cross-sectional side view of another example electrode configuration for the example microfluidic device shown in FIG. 1A.

In another example, and as shown in FIG. 1B, the electrical sensor 116 may include metal electrodes 111 positioned in pockets 115 of the channel 114. Thus, for instance, the electrodes 111 may be outside of the direct flow of fluid through the channel 114 while still generating an electrical field 132 to detect particles of interest flowing through the channel 114. The pocket arrangement shown in FIG. 1B may, for instance, stabilize the diffuse ionic charge region formed at the metal electrode-fluid interface. In one regard, by placing the electrodes 111 out of the main channel 114 flow, the disturbance of the electrode-fluid interface may be reduced, which may improve signal measurement quality and bandwidth.

The microfluidic device 102 is also depicted as including an actuator 118 positioned in the foyer 112. The actuator 118 may be a thermal resistor that produces vapor bubbles in the fluid contained within the foyer 112. In other examples, the actuator 118 may be implemented as piezo elements (e.g., PZT) whose electrically induced deflections generate fluid displacements within the foyer 112. In still other examples, the actuator 118 may be other types of deflective membrane elements activated by electrical, magnetic, and other forces. In one example, activation of the actuator 118 may cause some of the fluid contained in the foyer 112 to be dispensed or expelled out of the foyer 112 through an outlet 120. In this example, therefore, activation of the actuator 118 may cause a detected particle to be expelled from the foyer 112. In this example, the outlet 120 may be a nozzle, which may be positioned in line with the actuator 118. For instance, the actuator 118 may be positioned directly above or below the nozzle such that activation of the actuator 118 may cause a portion of the fluid contained in the foyer 112 to be expelled from the foyer 112.

In another example, the actuator 118 may be activated to cause the detected particle to remain in the foyer 112. In this example, the actuator 118 may be activated when the detected particle is adjacent to the actuator 118, which may initially cause the detected particle to be pushed away from the actuator 118 as a vapor bubble is formed, but may cause the detected particle to be pulled back toward the actuator 118 as the vapor bubble collapses. This process may be repeated to hold the particle within the foyer 112. In order to expel the particle from the foyer 112, the actuator 118 may be activated when the particle is sufficiently distant from the actuator 118 to prevent the particle from being pulled back toward the actuator 118 during the vapor bubble collapse. In addition, or in another example, the particle may be expelled from the foyer 112 through activation of another actuator (not shown) positioned downstream of the actuator 118 and/or as the fluid in the foyer 112 or further downstream of the foyer 112 evaporates, which may force the fluid contained in the foyer 112 to be expelled through the outlet 120.

The outlet 120 may lead to a second location in the microfluidic device 102. According to an example, the microfluidic device 102 may include a sensor in the second location that may perform additional diagnostic testing on the particle contained in the fluid. As discussed in detail herein, the microfluidic device 102 may include multiple locations and multiple actuators 118 that may be activated to sort detected particles into the multiple locations. For instance, a first type of particle may be moved to a first location and a second type of particle may be moved to a second location. In another example, the second location may include a nozzle through which the fluid may be dispensed from the microfluidic device 102. In any of these examples, predefined quantities of particles may be moved as desired in the microfluidic device 102.

In general, the structures and components of the microfluidic device 102 may be fabricated using integrated circuit microfabrication techniques such as electroforming, laser ablation, anisotropic etching, sputtering, dry and wet etching, photolithography, casting, molding, stamping, machining, spin coating, laminating, and the like. By way of particular example, the structures and components of the microfluidic device 102 may be formed of silicon.

According to an example, the controller 104 may supply power, e.g., AC or DC, to the electrical sensor 116 and may detect, based upon measurements obtained by the electrical sensor 116, when a particle of interest, e.g., a cell, a particular type of cell, etc., has passed through the channel 114. The electrical sensor 116 may also measure a change in the electrical field caused by the particle of interest passing through the channel 114. For instance, the AC and DC signals may be applied and the frequency and magnitude of the signals may be modulated to achieve a desired response from the particle of interest. The electrical sensor 116 may provide an electrical output signal representing the detected electrical signal to the controller 104. For instance, the controller 104 may directly receive signals from the electrodes in the electrical sensor 116 may detect changes in electrical field, e.g., changes in the strength of the electrical field, from the received signals.

Different types of particles, e.g., cells, may result in different changes in the electrical field, e.g., changes in detected impedance. In one regard, therefore, the controller 104 may identify the type of the particle passing through the channel 114 from the detected change in the electrical field.

That is, for instance, the controller 104 may determine an electrical signature of the detected particle from the detected change in the electrical field and may compare the determined electrical signature against a library of electrical signatures of known particles to identify the type of the particle. The electrical signature may correspond to the detected change in the electrical field such that a different electrical signature may correspond to a different detected change in electrical field. In one example, the electrical signature of the particle may be equivalent to the detected change in electrical field, e.g., change in electrical field strength, change in impedance, or the like.

According to an example, the controller 104 may control the actuator 118 to control movement of the detected particle based upon the determined electrical signature of the particle. For instance, the controller 104 may control the actuator 118 as discussed herein to either move the fluid containing the detected particle to a location outside of the foyer 112 or to hold the particle in the foyer 112.

The controller 104 may activate the actuator 118 a predefined number of times to expel the sensed particle of interest from the foyer 112 in instances in which less than all of the fluid contained in the foyer 112 is expelled during a single activation of the actuator 118. The predefined number of times may correspond to the number of times that the actuator 118 is to be activated in order to expel most or all of the fluid contained in the foyer 112 immediately following detection of the particle of interest. That is, for instance, the predefined number of times may correspond to the number of times that the actuator 118 is to be activated in order to cause the particle of interest contained in the foyer 112 to be expelled.

The controller 104 may be a computing device, a semiconductor-based microprocessor, a central processing unit (CPU), an application specific integrated circuit (ASIC), and/or other hardware device. The controller 104 may receive power from a power source or a power supply (not shown) and may supply AC or DC power to the electrical sensor 116. The controller 104 may also supply power to the actuator 118.

Figure 1C:
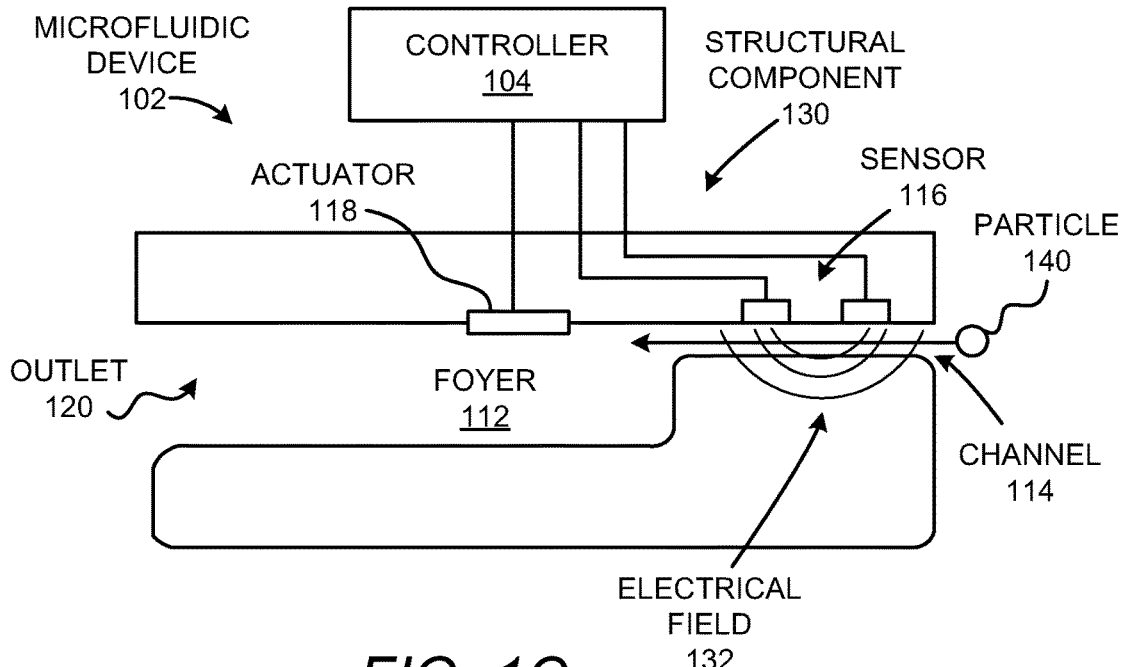
FIG. 1C shows a simplified cross-sectional side view of the example microfluidic device shown in FIG. 1A.

Turning now to FIG. 1C, there is shown a simplified cross-sectional side view of the example microfluidic device 102 shown in FIG. 1A. The microfluidic device 102 may be formed of a structural component 130, which may be formed of silicon, a polymeric material, an epoxy-based negative photoresist (such as SU-8), or the like. The structural component 130 may be formed through implementation of microfabrication techniques such as electroforming, laser ablation, anisotropic etching, sputtering, dry and wet etching, photolithography, casting, molding, stamping, machining, spin coating, laminating, and the like. In any regard, the actuator 118 and the components of the electrical sensor 116 may be formed into the structural component through integrated circuit fabrication techniques. In addition, the channel 114 and the outlet 120 may be formed through the structural component 130, for instance, by etching.

According to an example, the channel 114 may have a cross-section that is sized such that a single particle, e.g., cell, may pass through the channel 114 at one time. In this example, the channel 114 may be sized based upon the size of the particle 140 and may be slightly larger than the particle 140. By way of particular example, the channel 114 may have a height and a width that ranges from between about 5 microns to about 100 microns and a length that ranges from between about 5 microns to about 500 microns. The outlet 120 may be sized such that fluid contained in the foyer 112 may substantially be prevented from unintentionally being dispensed through the outlet 120. That is, for instance, the outlet 120 may be sized such that surface tension of the fluid prevents the fluid from being expelled by gravitational forces while allowing a predetermined amount of fluid to be expelled when the actuator 118 is activated. In addition, the outlet 120 may be sized such that a portion of the fluid contained in the foyer 112 may evaporate through the outlet 120.

The controller 104 may supply power to the electrical sensor 116, which may generate an electrical field 132. As fluid containing a particle of interest, or simply particle 140, such as a cell, is moved through the channel 114 as indicated by the arrow, the electrical field 132 may be disturbed or changed. The amount of disturbance, e.g., change in impedance, detected by the electrical sensor 116 may vary depending upon the type of particle 140 detected. For instance, a first type of particle 140 may cause a first change in impedance to be detected, a second type of particle 140 may cause a second change in impedance to be detected, etc. In other examples in which the electrical sensor 116 includes a light source and a photodetector, particles 140 having different characteristics may cause different changes in the detected light. In these examples, one of the electrical sensor 116 elements may be provided on a top of the channel 114 and another one of the electrical sensor 116 elements may be provided on a bottom of the channel 114.

In any regard, the controller 104 may receive electrical signals from the electrical sensor 116 as the electrical field 132 is disturbed or changed as the particle 140 passes by the electrical sensor 116. The controller 104 may determine that a particle 140 has passed through the channel 114 based upon the received electrical signals. In other words, the controller 104 may determine that the particle 140 has passed through the channel 114 and is in the foyer 112 from the received electrical signals. The controller 104 may also determine a type of the particle 140 based upon the measured disturbance in the electrical field, e.g., based upon a comparison of the measured disturbance with electrical field disturbances of known particle types. The controller 104 may also control the actuator 118 based upon the determined type of the particle 140.

As discussed herein, the controller 104 may control the actuator 118 to cause the particle 140 to be expelled from the foyer 112. The particle 140, and thus, the fluid in which the particle 140 is contained, may be moved through the channel 114 from the fluid slot 110 (shown in FIG. 1A) as fluid contained in the foyer 112 is expelled through the outlet 120. The fluid contained in the foyer 112 may be expelled through the outlet 120 when the actuator 118 is activated. In another example, the fluid contained in the foyer 112 may be expelled through the outlet 120 through evaporation of a portion of the fluid through the outlet 120.

The fluid contained in the foyer 112 may not be completely expelled when the actuator 118 is activated. According to an example, the controller 104 may cause the actuator 118 to be activated a predetermined number of times to cause all or substantially all of the fluid contained in the foyer 112 to be expelled following a determination of the electrical signature of the particle of interest 140. The predetermined number of times may be equivalent to a number of times that may result in the clearing of the fluid contained in the foyer 112 to ensure that the particle of interest 140 is expelled from the foyer 112. Thus, for instance, if a single activation of the actuator 118 results in a quarter of the fluid contained in the foyer 112 to be expelled, the controller 104 may cause the actuator 118 to be activated four times following a determination that the particle of interest 140 has passed through the channel 114.

Figure 2:
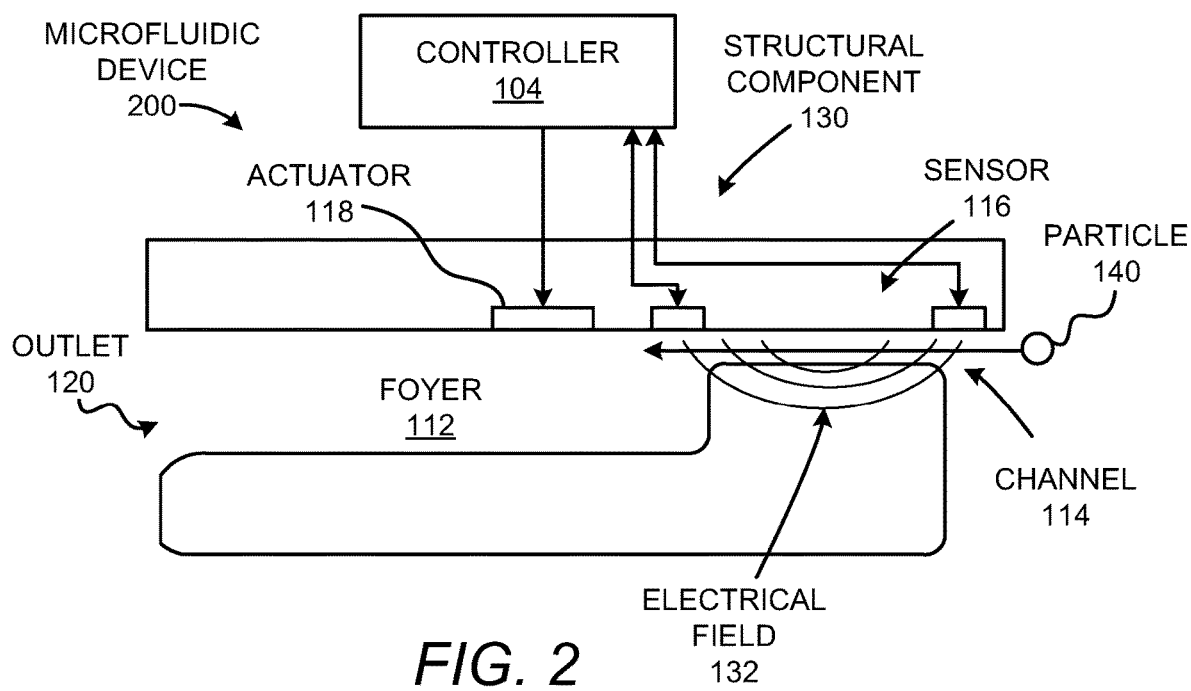
FIG. 2 shows a simplified cross-sectional side view of another example microfluidic device.

Turning now to FIG. 2, there is shown a simplified cross-sectional side view of another example microfluidic device 200. The microfluidic device 200 shown in FIG. 2 includes most of the same features as the microfluidic device 102 depicted in FIG. 1C and thus, common features will not be described in detail. The microfluidic device 200 shown in FIG. 2, however, differs from the microfluidic device 102 depicted in FIG. 1C in that the electrical sensor 116 elements are positioned outside of the channel 114. That is, one of the electrical sensor 116 elements is depicted as being positioned at an inlet of the channel 114 and the other one of the electrical sensor 116 elements is depicted as being positioned at an outlet of the channel 114.

Figure 3:
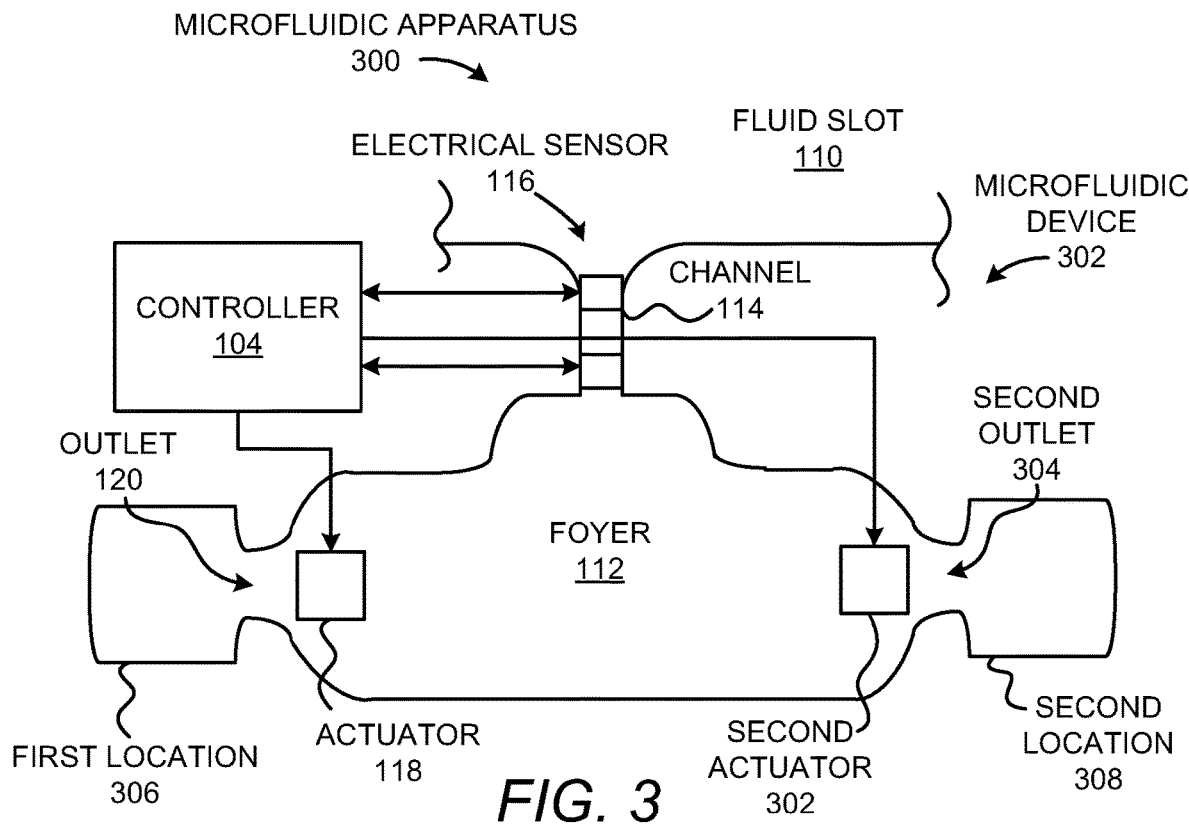
FIG. 3 shows a simplified block diagram of another example microfluidic apparatus.

Turning now to FIG. 3, there is shown a simplified block diagram of another microfluidic apparatus 300. The microfluidic apparatus 300 shown in FIG. 3 includes most of the same features as the microfluidic apparatus 100 depicted in FIG. 1A and thus, common features will not be described in detail. The microfluidic apparatus 300 shown in FIG. 3, however, differs from the microfluidic apparatus 100 depicted in FIG. 1A in that the microfluidic device 302 includes a number of different features as compared with the microfluidic device 102. Particularly, the microfluidic device 302 may include a second actuator 304 and a second outlet 306. The second actuator 304 and the second outlet 306 may be positioned on an opposite side of the foyer 112 with respect to the actuator 118 and the outlet 120. In addition, the actuator 118 may be positioned adjacent to the outlet 120 and the second actuator 304 may be positioned adjacent to the second outlet 306. The second actuator 304 may also be implemented as a similar type of actuator as the actuator 118, e.g., thermal resistor, PZT, etc.

As also shown in FIG. 3, the controller 104 may control the second actuator 304, e.g., through a communication or signal line. That is, the controller 104 may supply energy to the second actuator 304 to cause the second actuator 304 to become activated and therefore cause some of the fluid contained in the foyer 112 to be expelled through the second outlet 306. According to an example, the controller 104 may control one of the actuator 118 and the second actuator 304 to control the direction in which the fluid contained in the foyer 112 is directed out of the foyer 112. The controller 104 may control, e.g., activate, the actuator 118 or the second actuator 304 based upon the type of particle 140 detected. For instance, in response to determining that the detected particle 140 is a first type of particle, the controller 104 may activate the actuator 118 such that the fluid containing the detected particle 140 is directed to a first location 308 through the outlet 120. Likewise, in response to determining that the detected particle 140 is a second type of particle, the controller 104 may activate the second actuator 304 such that the fluid containing the detected particle 140 is directed to a second location 310 through the outlet 120.

The controller 104 may activate one of the actuator 118 and the second actuator 304 a predetermined number of times until a volume of fluid equal to or substantially equal to the volume of fluid contained in the foyer 112 at the time the particle of interest 140 was detected to have moved through the channel 114 has been expelled from the foyer 112. In addition, although the actuator 118 and the second actuator 304 have been depicted as being positioned within the foyer 112, either or both of the actuator 118 and the second actuator 304 may be positioned on the opposite sides of the respective outlets 120, 306. That is, for instance, the actuator 118 may be positioned in the first location 308. The placements of the actuator 118 and the second actuator 304 may be determined based upon fluid flow characteristics as the actuator 118 and the second actuator 304 are activated.

According to an example, the first location 308 and the second location 310 may be other locations in the microfluidic device 304 at which additional sensing on the fluid and/or particles 140 may be performed. The additional sensing may include, for instance, counting of different types of particles, additional sorting of the particles, differentiation of the particles, etc. In other examples, the first location 308 and the second location 310 may include nozzles through which fluid may be dispensed from the microfluidic device 302. In these examples, the actuator 118 may be positioned in-line with one of the nozzles such that activation of the actuator 118 may result in the fluid being directly expelled through the nozzle. Likewise, the second actuator 304 may be positioned in-line with another one of the nozzles such that activation of the second actuator 304 may result in the fluid being directly expelled through another nozzle.

Although the microfluidic devices 102, 200, and 302 have been depicted as having a single actuator 118 or two actuators 118, 304, it should be understood that the microfluidic devices 102, 200, 302 disclosed herein may include a larger number of actuators and outlets without departing from scopes of the present disclosure.

Figure 4:
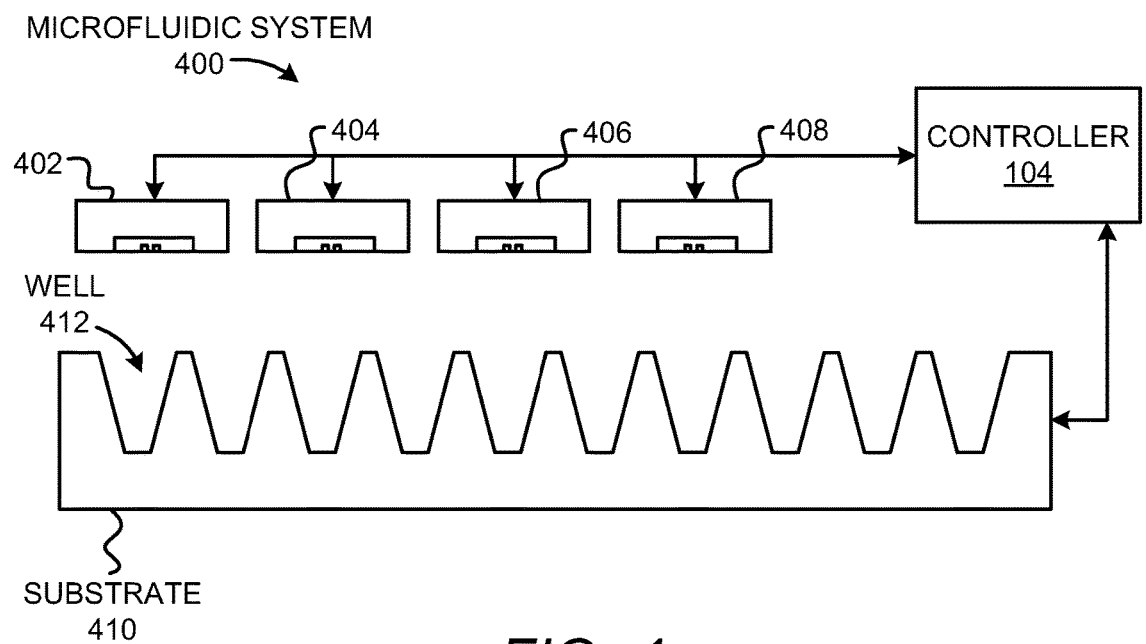
FIG. 4 shows a simplified block diagram of an example microfluidic system.

Turning now to FIG. 4, there is shown a simplified block diagram of an example microfluidic system 400. The microfluidic system 400 is depicted as including a plurality of microfluidic apparatuses 402-408, a substrate 410, and a controller 104. Each of the microfluidic apparatuses 402-408 may be configured as shown in either of FIGS. 1A and 3 and may each contain a plurality of microfluidic devices. The microfluidic devices may each be configured as shown in any of FIGS. 1A-3. For instance, each of the microfluidic apparatuses 402-408 may contain 6 or more microfluidic devices 102, 200, 302.

The substrate 410 is depicted as including a plurality of wells 412. According to an example, the substrate 410 may be movable in one dimension, two dimensions, or three-dimensions with respect to the microfluidic apparatuses 402-408. In this example, the controller 104 may control a motor or other actuator to move the substrate 410 with respect to the microfluidic apparatuses 402-408. For instance, the controller 104 may cause the substrate 410 to be moved such that a particular well 412 is positioned beneath a particular one of the microfluidic apparatuses 402-408. In this regard, different fluids may be inserted into each of the microfluidic apparatuses 402-408 and the controller 104 may individually control the microfluidic devices contained in the microfluidic apparatuses 402-408 to dispense the fluids into selected ones of the wells 412.

By way of particular example, the controller 104 may control the microfluidic devices to dispense a predetermined number of particles, e.g., cells, into individual wells 412. That is, the controller 104 may determine when a particle of interest has flowed through a channel in a microfluidic device and may cause the particle of the interest to be dispensed into a particular well 412. The controller 104 may repeat that process until a predetermined number of particles have been dispensed into the well 412 and may move the substrate 410 such that a different well 412 is positioned beneath the microfluidic apparatus 402 containing the microfluidic device. The controller 104 may also determine the type of particle that has flowed through the channel and may control the position of the substrate 410 such that different types of particles are dispensed into different ones of the wells 412.

Figure 5:
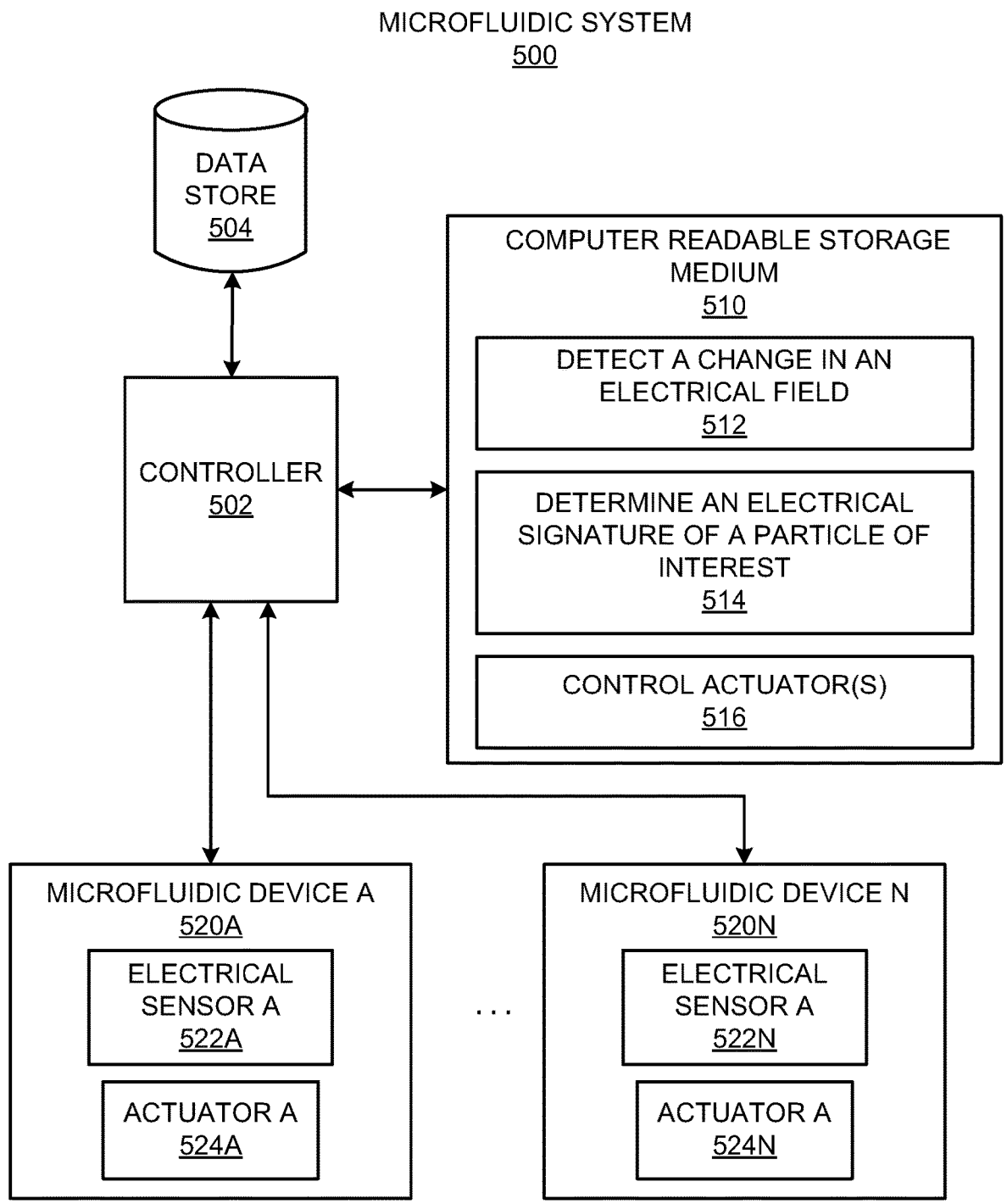
FIG. 5 depicts a simplified block diagram of an example microfluidic system.

With reference now to FIG. 5, there is shown a simplified block diagram of an example microfluidic system 500. It should be understood that the microfluidic system 500 depicted in FIG. 5 may include additional components and that some of the components described herein may be removed and/or modified without departing from a scope of the microfluidic system 500 disclosed herein.

The microfluidic system 500 is shown as including a controller 502 and a data store 504. The controller 502 may be the same as the controller 104 depicted in and described above with respect to FIG. 1A. The controller 502 may thus be a computing device, a semiconductor-based microprocessor, a central processing unit (CPU), an application specific integrated circuit (ASIC), a programmable logic device (PLD), and/or other hardware device. The controller 502 may also receive power from a power source or a power supply (not shown). The data store 504 may be Random Access Memory (RAM), an Electrically Erasable Programmable Read-Only Memory (EEPROM), a storage device, an optical disc, or the like.

The microfluidic system 500 may also include a computer readable storage medium 510 on which is stored machine readable instructions 512-516 that the controller 502 may execute. More particularly, the controller 502 may fetch, decode, and execute the instructions 512 to detect a change in an electrical field caused by a particle of interest 140 in a fluid passing into a foyer through a channel 114. The controller 502 may fetch, decode, and execute the instructions 514 to determine an electrical signature of the particle of interest 140. The controller 502 may fetch, decode, and execute the instructions 516 to control an actuator or multiple actuators 118, 304 based upon the determined electrical signature of a particle of interest 140. As another example or in addition to retrieving and executing instructions, the controller 502 may include one or more electronic circuits that include components for performing the functionalities of the instructions 512-516.

The computer readable storage medium 510 may be any electronic, magnetic, optical, or other physical storage device that contains or stores executable instructions. Thus, the computer readable storage medium 510 may be, for example, Random Access Memory (RAM), an Electrically Erasable Programmable Read-Only Memory (EEPROM), a storage device, an optical disc, and the like. The computer readable storage medium 510 may be a non-transitory machine-readable storage medium, where the term "non-transitory" does not encompass transitory propagating signals.

The microfluidic system 500 may further include a plurality of microfluidic devices 520a-520n, in which the variable "n" represents an integer value greater than one. Each of the microfluidic devices 520a-520n may be similar to one of the microfluidic devices 102, 200, 300 depicted in FIGS. 1A-3. In this regard, the microfluidic devices 520a-520n may each include an electrical sensor 522a-522n and an actuator 524a-524n. In other examples, for instance, in microfluidic devices 302 having multiple actuators, the microfluidic devices 520a-520n may each include multiple actuators 524a-524n. In addition, or as another example, the microfluidic devices 520a-520n may include multiple electrical sensors 522a-522n.

In some examples, the microfluidic devices 520a-520n are housed in a single microfluidic apparatus. In some examples, a first group of the microfluidic devices 520a-520n is housed in a first microfluidic apparatus and a second group of the microfluidic devices 520a-520n is housed in a second microfluidic apparatus.

According to various examples, the microfluidic system 500 may be a standalone system such that the controller 502, the data store 504, and the computer readable storage medium 510 are integrated with the microfluidic devices 520a-520n. In other examples, however, the microfluidic devices 520a-520n may be housed in a microfluidic apparatus that does not include the controller 502, the data store 504, or the computer readable storage medium 510. In these examples, the controller 502, the data store 504, and the computer readable storage medium 510 may be housed in a computing device, such as a laptop computer, a tablet computer, a smartphone, etc. Thus, for instance, the microfluidic apparatus containing the microfluidic devices 520a-520n may include an interface for wired and/or wireless connection to the controller 502. In these examples, therefore, the microfluidic apparatus may be of relatively lower complexity and microfluidics operations on the microfluidic apparatus may be controlled by a controller, e.g., microprocessor, of a computing device. Additionally, the computing device may provide power, a user interface, an electronic interface board, etc., to the microfluidic devices 520a-520n.

Figure 6:
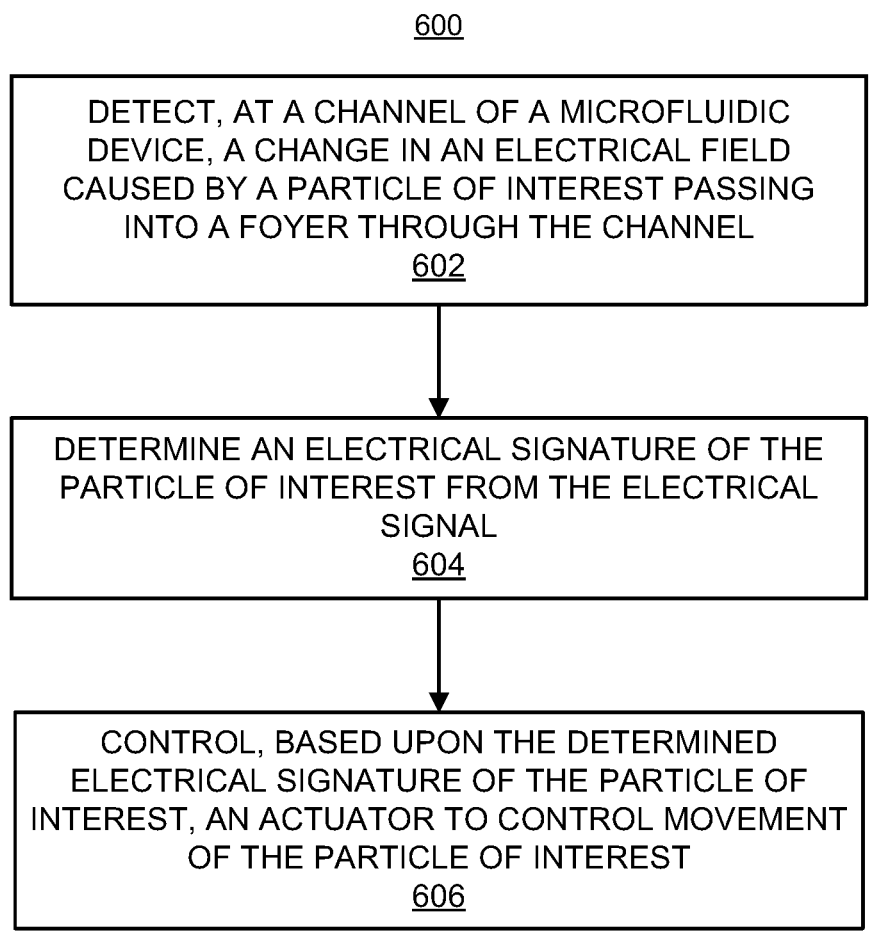
FIGS. 6 and 7, respectively, depict example methods for controlling fluid movement in a microfluidic device.
Figure 7:
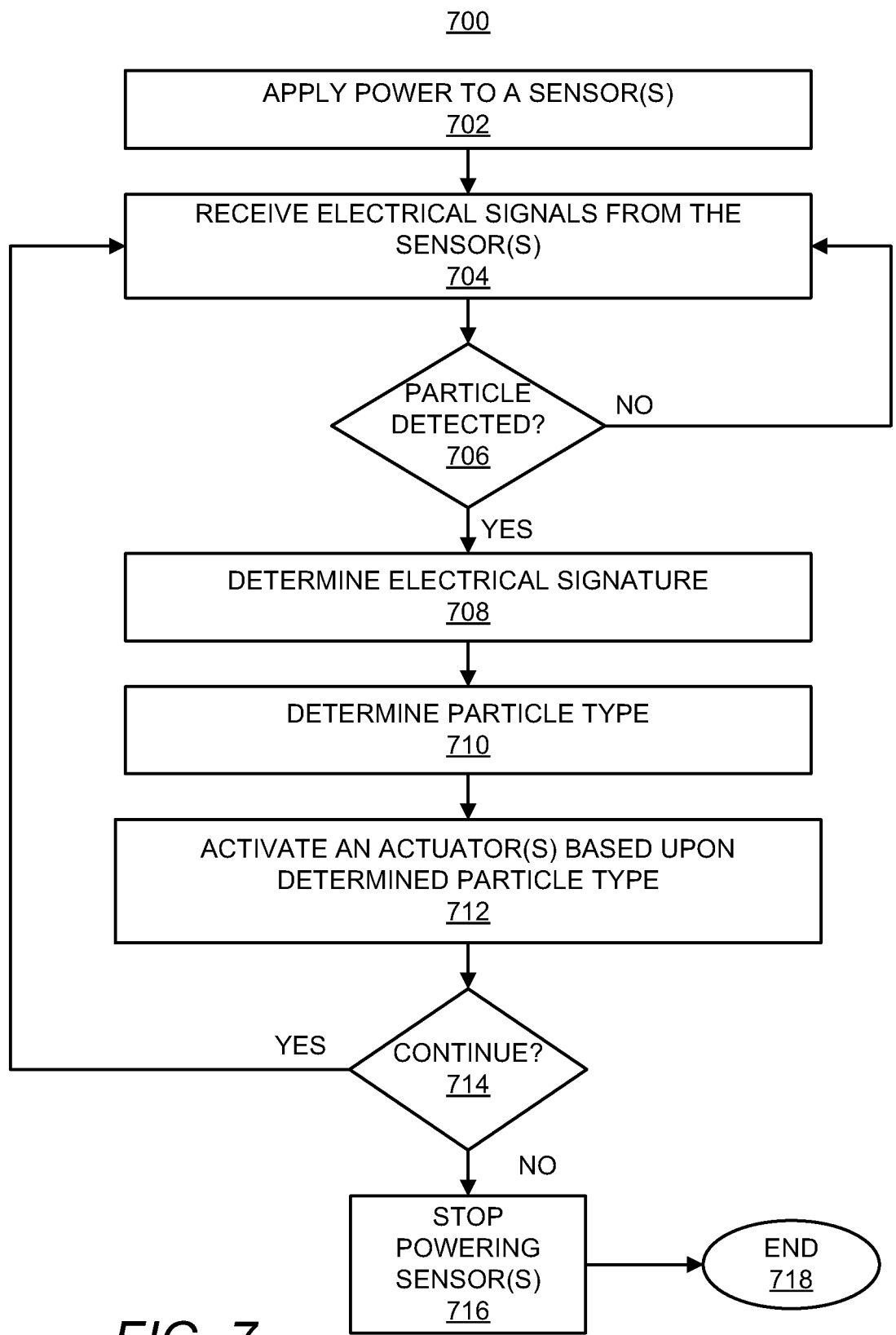

Various manners in which the microfluidic system 500 may be implemented are discussed in greater detail with respect to the methods 600 and 700 respectively depicted in FIGS. 6 and 7. Particularly, FIGS. 6 and 7, respectively, depict example methods 600 and 700 for controlling movement of fluid in a microfluidic device. It should be apparent to those of ordinary skill in the art that the methods 600 and 700 may represent generalized illustrations and that other operations may be added or existing operations may be removed, modified, or rearranged without departing from the scopes of the methods 600 and 700.

The descriptions of the methods 600 and 700 are made with reference to the microfluidic system 500 illustrated in FIG. 5 for purposes of illustration. It should, however, be clearly understood that microfluidic systems having other configurations may be implemented to perform either or both of the methods 600 and 700 without departing from scopes of the methods 600 and 700.

With reference first to FIG. 6, at block 602, a detection may be made, at a channel 114 of a microfluidic device 520a, of change in an electrical field caused by a particle of interest 140 in a fluid passing into a foyer 112 of the microfluidic device through the channel 114. For instance, the controller 502 may supply energy to the electrodes of an electrical sensor 522a and the electrodes may generate an electrical field. As fluid containing the particle of interest 140 passes through the electrical field, the particle of interest 140 may cause a disturbance in the electrical field, e.g., a change in impedance of the electrical field, to be detected. For instance, the controller 502 may execute the instructions 512 to detect a change in impedance caused by the particle of interest 140 from changes in electrical signals received from the electrical sensor 522a.

At block 604, the controller 502 may determine an electrical signature of the particle of interest 140 from the received electrical signals. For instance, the controller 502 may execute the instructions 514 to determine the electrical signature of the particle of interest 140. The electrical signature of the particle of interest 140 may correspond to the detected change in impedance caused by the particle of interest 140. As particles of interest 140, e.g., organic cells, having different characteristics, e.g., structures, compositions, sizes, etc., may cause different changes in impedance to be detected, the changes in impedance caused by the particles of interest 140 may be used as identifiers or signatures of the particles of interest 140. According to an example, the controller 502 may determine the electrical signature of the particle of interest 140 to be equivalent to the detected change in electrical signals, e.g., impedance change, caused by the particle of interest 140 in the electrical field generated by the electrodes of the electrical sensor 522a.

At block 606, the controller 502 may control, based upon the determined electrical signature of the particle of interest 140, an actuator 524a to control movement of the particle of interest 140. For instance, the controller 502 may execute the instructions 516 to control the actuator 524a to one of move the particle of interest 140 out of the foyer 112 and hold the particle of interest 140 inside of the foyer 112. According to an example, the controller 502 may control the actuator 524a to move the particle of interest 140 out of the foyer 112 in response to the particle of interest 140 having a first electrical signature and to hold the particle of interest 140 inside the foyer 112 in response to the particle of interest 140 having a second electrical signature. The controller 502 may control movement of the particle of interest 140 by controlling the timing at which the actuator 524a is activated.

For instance, the controller 502 may activate the actuator 524a at a specified time following detection of the particle of interest 140 depending upon whether the particle of interest 140 is to be expelled from the foyer 112 or to be held in the foyer 112. In this example, the controller 502 may activate the actuator 524a at a first specified time following detection of the particle of interest 140, e.g., when the particle of interest 140 is likely coincident with the actuator 524a, to hold the particle of interest 140 inside the foyer 112. In addition, the controller 502 may activate the actuator 524a at a second specified time following detection of the particle of interest 140, e.g., when the particle of interest 140 has likely moved past the actuator 524a.

In another example in which the microfluidic device 102, 200, 302 includes another actuator to move fluid out of the foyer 112, e.g., another actuator positioned downstream of the foyer 112, the controller 502 may activate the actuator 524a to hold the particle of interest 140 inside the foyer 112. In addition, the controller 112 may maintain the actuator 524a in a non-activated state to expel the particle of interest 140 outside of the foyer 112.

Turning now to FIG. 7, at block 702, power may be applied to a sensor 522a or to multiple sensors 522a-522n. For instance, the controller 502 may supply power to the sensor(s) 522a-522n such that the sensor(s) 522a-522n generates an electric field. As noted herein, the sensor(s) 522a-522n (or the controller 502) may detect disturbances, e.g., changes, in the electrical field caused by the particle of interest 140 as the particle of interest 140 passes through the electric field generated by the sensor(s) 522a-522n.

At block 704, the controller 502 may receive electrical signals from the electrical sensor(s) 522a-522n. For instance, the controller 502 may continuously receive electrical signals from the electrical sensor(s) 522a-522n and may determine when there is a disturbance in the electric field generated by the electrical sensor(s) 522a-522n.

At block 706, the controller 502 may determine whether a particle of interest 140 has been detected. That is, for instance, the controller 502 may detect that a particle of interest 140 has passed through the channel 114 in response to determination that the electric field has been disturbed. The controller 502 may also determine the magnitude of the disturbance. In another example, if the controller 502 does not detect a particle of interest 140, the controller 502 may continue receive electrical signals from the electrical sensor(s) 522a-522n as indicated at block 704. The controller 502 may also repeat blocks 704 and 706 until the controller 502 detects a particle of interest 140 at block 706.

At block 708, responsive to detecting the particle of interest 140, the controller 502 may determine an electrical signature of the particle of interest 140. The electrical signature may correspond to the determined magnitude of the disturbance, e.g., the level of change in the electrical field.

At block 710, the controller 502 may determine the type of the particle of interest 140 from the determined electrical signature. The controller 502 may determine the type of the particle of interest 140 through a comparison of the determined electrical signature with electrical signatures of known particle types. Thus, for instance, the controller 502 may compare the determined electrical signature against the electrical signatures stored in a library to determine the electrical signature of the particle of interest 140. However, the type of the particle 140 may be equivalent to the determined electrical signature of the particle 140.

At block 712, the controller 502 may activate an actuator 524a or multiple actuators 524a-524n based upon the determined electrical signature and/or the determined particle type. For instance, in response to the particle 140 being of a first type, the controller 502 may activate the actuator 524a to one of hold the particle 140 in the foyer 112 or expel the particle 140 from the foyer 112 as discussed herein. In addition or as another example, in response to the particle 140 being of a first type, the controller 502 may activate an actuator 524a and in response to the particle 140 being of a second type, the controller 502 may activate a second actuator 524b. As also discussed above, activation of the actuator 524a may cause the fluid containing the particle 140 to be directed to a first location 306 and activation of the second actuator 524b may cause the fluid containing the particle 140 to be directed to a second location 308.

According to an example, the actuator 524a and/or the second actuator 524b may be activated a predetermined number of times to evacuate a predefined volume of fluid through an outlet 120 or multiple outlets 120, 304 from the foyer 112 of a microfluidic device 102, 200, 302. According to an example, the predefined volume of fluid is equivalent or nearly equivalent to a total volume of fluid contained in the foyer 112 prior to the foyer 112 being refilled with additional fluid from a fluid slot 110. In other words, the predetermined number of times at which the actuator(s) 524a-524n may be actuated may be equivalent to a number of times that cause all or nearly all of the fluid contained in the foyer 112 at a time when the particle of interest 140 was determined to have moved through the channel 114 and into the foyer 112 to be expelled from the foyer 112.

Prior to activation of the actuator(s) 524a-524n, the controller 502 may determine whether a substrate 410 containing a plurality of wells 412 is to be moved based upon the determined type of the particle 140. The controller 502 may determine that the substrate 410 is to be moved in response to a determination that the particles having the determined particle type are to be dispensed into a well other than the one that is currently positioned to receive particle 140. Thus, for instance, the controller 502 may determine that the substrate 410 is to be moved in instances in which the particle is of a type that is to be dispensed into another well 412.

In response to a determination that the substrate 410 is to be moved, the controller 502 may cause the substrate to be moved. That is, the controller 502 may control a motor or other actuator to cause the substrate 410 to be moved such that a desired well 412 is positioned to receive the particle of interest 140 prior to activation of the actuator(s) 524a-524n at block 712.

At block 714, the controller 502 may determine whether to continue the method 700. The controller 502 may determine that the method 700 is to be continued in response to a determination that movement of an additional particle of interest 140 is to be controlled. In response to a determination that the method 700 is to continue, the controller 502 may repeat blocks 704-714 until the controller 140 determines that the method 700 is to end. Following the "no" condition at block 714, the controller 140 may stop supplying power to the sensor(s) 522a-522n as indicated at block 716. In addition, the controller 502 may end the method 700 as indicated at block 718.

Through implementation of either of the methods 600 and 700, movement of particles of interest 140, e.g., cells, inside of a microfluidic device 102, 200, 302 may be controlled.

Some or all of the operations set forth in the methods 600 and 700 may be contained as utilities, programs, or subprograms, in any desired computer accessible medium. In addition, the methods 600 and 700 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A microfluidic apparatus comprising:
   a fluid slot;
   a foyer, wherein the foyer is in fluid communication with the fluid slot via a channel having a relatively smaller width than the foyer;
   an electrical sensor to measure a change in an electrical field caused by a particle of interest in a fluid passing through the channel from the fluid slot to the foyer;
   an actuator to apply pressure to fluid contained in the foyer, wherein the pressure applied by the actuator is to cause the fluid to flow within the foyer and cause movement of the particle of interest; and
   a controller to receive the measured change in the electrical field from the electrical sensor, determine, from the received change in the electrical field, an electrical signature of the particle of interest, and control the actuator to control movement of the particle of interest based upon the determined electrical signature of the particle of interest.

2. The microfluidic apparatus of claim 1, wherein the controller is to determine that the particle of interest has a first electrical signature and wherein the controller is to control the actuator to cause the particle of interest to remain in the foyer in response to the particle of interest having the first electrical signature.

3. The microfluidic apparatus of claim 2, wherein the controller is to determine that the particle of interest has a second electrical signature and wherein the controller is to control the actuator to cause the particle of interest to be ejected out of the foyer in response to the particle of interest having the second electrical signature, wherein the second electrical signature differs from the first electrical signature.

4. The microfluidic apparatus of claim 1, further comprising:
   a second actuator,
   wherein the controller is to activate the actuator in response to the particle of interest having a first electrical signature and to activate the second actuator in response to the particle of interest having a second electrical signature.

5. The microfluidic apparatus according to claim 4, further comprising:
   a first location external to the foyer;
   a second location external to the foyer; and
   wherein the controller is to activate the actuator to direct the particle of interest into the first location and to activate the second actuator to direct the particle of interest into the second location.

6. The microfluidic apparatus of claim 4, wherein the second actuator is positioned in an opposite side of the foyer with respect to the actuator.

7. The microfluidic apparatus according to claim 1, wherein the electrical sensor comprises one of metal electrodes and insulated electrodes.

8. The microfluidic apparatus according to claim 1, further comprising:
   a nozzle in fluid communication with the foyer, wherein the actuator is positioned above the nozzle, and wherein the controller is to activate the actuator to expel fluid contained in the foyer onto a testing substrate in response to the particle of interest having a first electrical signature and to activate the actuator to expel fluid contained in the foyer into a waste reservoir in response to the particle of interest having a second electrical signature.

9. A method comprising:
   detecting, at a channel of a microfluidic device, a change in an electrical field caused by a particle of interest in a fluid passing into a foyer of the microfluidic device through the channel;
   determining an electrical signature of the particle of interest from the detected change in the electrical field; and
   controlling, based upon the determined electrical signature of the particle of interest, an actuator to apply pressure to the fluid in the foyer to control flow of the fluid through the foyer and thereby control movement of the particle of interest.

10. The method according to claim 9, further comprising:

determining whether the electrical signature matches a first electrical signal;

in response to a determination that the determined electrical signature matches the first electrical signal, controlling the actuator to cause the particle of interest to remain in the foyer; and in response to a determination that the determined electrical signature does not match the first electrical signal, controlling the actuator to cause the particle of interest to be moved to a location external to the foyer.

11. The method according to claim 9, further comprising:

determining whether the electrical signature matches a first electrical signature;

in response to a determination that the determined electrical signature matches the first electrical signature, controlling the actuator to cause the particle of interest to be moved to a first location external to the foyer; and in response to a determination that the determined electrical signature does not match the first electrical signature, controlling a second actuator to cause the particle of interest to be moved to a second location external to the foyer.

12. The method according to claim 9, wherein controlling the actuator to control movement of the particle of interest further comprises controlling the actuator to move the particle of interest to a second sensing location, said method further comprising:

performing a second sensing operation on the particle of interest at the second sensing location.

13. A microfluidic apparatus comprising:

a channel;

an electrical sensor to measure a change in an electrical field caused by a particle of interest while the particle of interest is in the channel;

a foyer in fluid communication with the channel;

an actuator positioned in the channel, wherein the actuator is to control movement of the particle of interest in the foyer by applying pressure to fluid in the foyer to cause flow of fluid through the foyer;

a controller to activate the actuator to one of move the particle of interest out of the foyer and hold the particle of interest inside the foyer based upon the measured change in the electrical field caused by the particle of interest.

14. The microfluidic apparatus according to claim 13, wherein the controller is further to determine an electrical signature of the particle of interest from the measured change in the electrical field, to compare the determined electrical signature with previously determined electrical signatures, and to activate the actuator based upon the comparison.

15. The microfluidic apparatus according to claim 13, further comprising:

a second actuator, wherein the controller is to determine an electrical signature of the particle of interest from the measured change in electrical field, to activate the actuator in response to the particle of interest having a first electrical signature, and to activate the second actuator in response to the particle of interest having a second electrical signature.

* * * * *